Jan. 7, 1941.   P. B. PARKS ET AL   2,228,125
VAPOR REGULATING APPARATUS
Filed Aug. 3, 1939   2 Sheets-Sheet 2
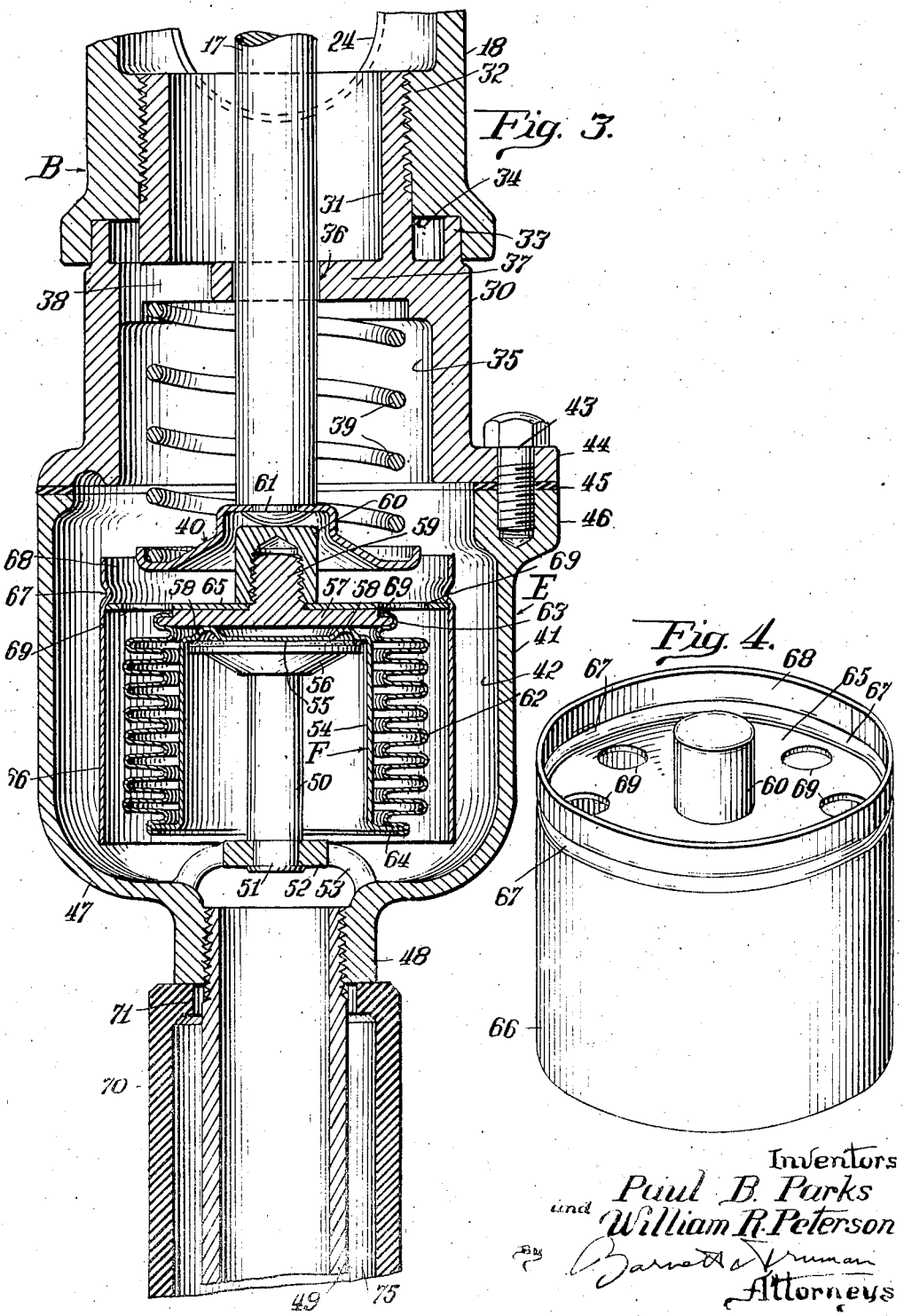
Inventors
Paul B. Parks
and William R. Peterson
Barnett Truman
Attorneys Patented Jan. 7, 1941

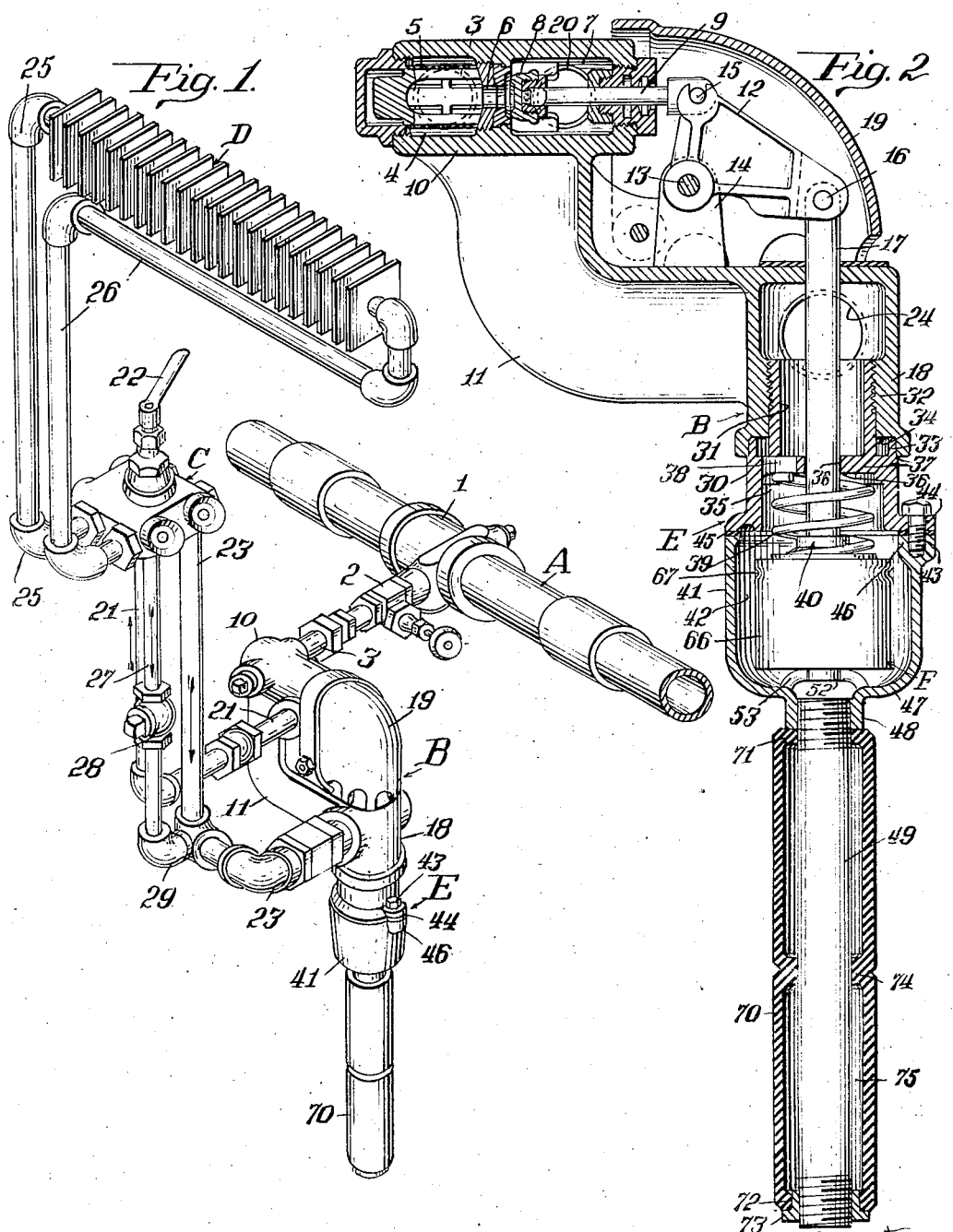

2,228,125

UNITED STATES PATENT OFFICE

2,228,125

VAPOR REGULATING APPARATUS

Paul B. Parks, Oak Park, and William R. Peterson, Chicago, Ill., assignors to Vapor Car Heating Company, Inc., Chicago, Ill., a corporation of New York Application August 3, 1939, Serial No. 288,105

8 Claims. (Cl. 236—40)

This invention relates to certain new and useful improvements in a vapor regulating apparatus, more particularly to a vapor regulator that will respond more quickly than similar mechanisms heretofore in use to small changes in the temperature of the fluids returned from the radiating or heat-transfer system.

As is well known, a vapor regulator is a device for automatically controlling the flow of low pressure steam into a heat transfer system so that this system, or a selected portion thereof will be continuously filled with steam at substantially atmospheric pressure, and the condensate and non-condensable gases will be drained or forced from the system. Such a control device utilizes a valve positioned between the main source of steam and the radiating or heat-transfer system, the movement of this valve toward or from closed position being regulated by a thermostatic device that is exposed to the fluids returned from the radiating system, such fluids comprising a mixture of steam, condensate, and non-condensable gases. When the thermostatic device is enveloped by steam or subjected to substantially steam temperature, that is when the system is filled with steam, the thermostatic device will move or expand so as to close the valve. When this thermostatic device is exposed to a considerably lower temperature it will move in the opposite direction or contract so as to cause the valve to be opened and admit more steam to the system. The present improved vapor regulator is of this general type but embodies a more highly sensitive thermostatic member that will function within the narrow range of temperatures between the temperature of steam and the temperature of condensate, that is the thermostatic member will contract to open the valve when contacted by the returned condensate at a temperature only slightly lower than that of steam. Means are also provided for directing a supply of stored up condensate into direct contact with the thermostatic member at such times as a rapid opening of the valve is desired.

In order to control a vapor steam radiator in an air delivery duct by a thermostat responding to changes in duct temperature, which thermostat turns on or off a valve to feed steam to the radiator or by-pass the radiator, it has been found necessary to develop a vapor-regulator that will respond almost immediately to the demand for steam. Regulators heretofore in use were entirely too slow in responding when the main valve was opened and there was an immediate demand for steam in the radiator. This has been due to the fact that the vapor regulator was maintaining a temperature of substantially 212° at the thermostatic diaphragm or bellows, and this temperature has to be dissipated before the regulator will open the valve sufficiently far to feed steam to the system under a pressure sufficient to fill the radiator. The present improved vapor-regulator is sufficiently sensitive and quick-acting to solve this problem.

The principal object of this invention is to provide an improved vapor regulator of the type briefly discussed hereinabove and disclosed in detail in the specifications which follow.

Another object is to provide a vapor-regulator that will function in the narrow temperature range between the temperature of steam and the temperature of condensate.

Another object is to provide an improved vapor-regulator that will immediately open its valve when the thermostatic member is contacted by condensate at a temperature only slightly lower than that of steam.

Another object is to provide an improved vapor-including means for directing all condensate drained from the radiating system into intimate contact with the thermostatic bellows.

Another object is to provide an improved form of thermostatic valve-operating mechanism.

Another object is to provide an improved drain assembly for a vapor regulator.

Other objects and advantages of this invention will be more apparent from the following detailed description of one approved form of apparatus constructed and operating according to the principles of this invention.

In the accompanying drawings:

Fig. 1 is a perspective view showing a vapor-heating assembly comprising the improved vapor-regulator.

Fig. 2 is a longitudinal vertical section through the assembled vapor-regulator.

Fig. 3 is a longitudinal central vertical section through the novel temperature-responsive portion of the regulator.

Fig. 4 is a perspective view of the shield and condensate-collecting member.

Referring first to Figs. 1 and 2, the source of steam supply is indicated at A. This invention relates more particularly to heating systems for railway passenger cars (although not necessarily limited to such use) and in such a heating system the pipe A indicates the main train pipe which runs throughout the length of the train and delivers steam from the source at the locomotive. This steam, under fairly high pressure, flows through the strainer T fitting 1 through reducing valve 2 and pipe 3 into the supply chamber 4 of the vapor-regulator indicated generally at B. The steam thus supplied to chamber 4 (Fig. 2) flows through strainer 5 and valve passage 6 into the feed chamber 7, when valve 8 is open. When valve 8 is moved to closed position (that is toward the left in Fig. 2) the flow of steam through passage 6 will be cut off. The valve 8 is moved by a valve stem 9 which projects slidably out through a suitable packing in the end portion of the housing 10 carried at the upper end of the main supporting bracket member 11. A bell crank 12 pivoted at 13 in a fixed bracket member 14 projecting from main bracket 11, has an upwardly extending arm pivoted at 15 to the outer end of valve stem 9, and a horizontally extending arm pivoted at 16 to the upper end of a link or operating rod 17 which projects downwardly through the housing 18 formed in the horizontally extending arm of bracket 11. The link 17 is reciprocated vertically by the thermostatically actuated portion of the vapor regulator as hereinafter described. The link and lever connections are enclosed by a removable shield member 19. All of this upper portion of the vapor-regulator, as hereinabove described, is old and well known in the art, the novel features of this improved vapor regulator residing in the lower portion E of the vapor-regulator as will be hereinafter described in detail.

When the valve 8 is in open position, steam will flow out from feed chamber 7 through port 20 and pipe 21 to the main control valve C. This valve C is of well known form comprising a plurality of interior chambers which are selectively connected or disconnected by a rotatable valve member operated by the outer crank arm 22. This valve may be manually controlled but usually and preferably is actuated electrically from a thermostat positioned in the space being heated. When valve C is in the "off" or closed position, the steam supplied through pipe 21 will be shunted through valve C and back through pipe 23 and port 24 (Fig. 2) into the housing 18 of the vapor-regulator as already referred to. When valve C is moved to the "on" or open position, the flow of steam from supply pipe 21 will go through valve C into pipe 25 and thence through the radiator indicated generally at D, returning along with condensate and non-condensable gases through pipe 26 to and through valve C and thence through pipe 23 as before back to the return portion of the vapor regulator. The apparatus D may be a radiator positioned in an overhead duct through which a flow of air is maintained, the present improved vapor-regulator being especially useful in this type of heating system, but on the other hand the device D may indicate any other suitable type of radiating or heat-transfer mechanism.

Preferably a drain pipe 27 extends downwardly from valve C and the valve is so designed that when in the closed position (that is when the loop comprising pipes 25, 26 and radiator D is cut off from the steam supply system) the drain pipe 27 will be connected with this loop so that all condensate will flow into this pipe. Pipe 27 has a one-way valve 28 therein, and discharges at its end through fitting 29 into the return pipe 23. Check valve 28 opens only downwardly, that is away from valve C and toward the vapor regulator B. When valve C is in closed position and steam is no longer being supplied to this radiating loop, the steam already in the loop will condense thus creating a partial vacuum in the loop and check valve 28 will close thus preventing the outflow of condensate which will be stored up in pipe 27 above the valve 28. When the valve C and the valve of the vapor-regulator are again opened so as to break this vacuum, check valve 28 will open so as to discharge this stored up condensate which will now flow through pipe 23 and be dumped onto the thermostatic member in the return chamber of the vapor-regulator, all as hereinafter described. The use of the check valve 28 which establishes a vacuum in the radiating loop is disclosed and claimed in the patent to Russell and Smith, No. 2,092,265, granted September 7, 1937, and this portion of the apparatus as well as the structure of valve C will be better understood by reference to this patent. The vacuum thus created in the radiating loop serves to facilitate the inflow of steam when valve C is again opened. The improved vapor-regulator, the novel features of which are now about to be described in more detail, is designed to cooperate with this vacuum-producing apparatus by expediting the complete opening of the vapor regulator valve 8 when distributing valve C has been moved to open position.

The novel portion of the vapor regulator indicated generally at E will now be described, referring especially to Figs. 2, 3 and 4. As already noted, all of the fluids returned from the radiating system flow through port 24 into the housing 18. In vapor regulators of the type heretofore in use, a generally bell-shaped housing is suspended from housing 18, this bell-shaped housing comprising an outer passage through which the condensate drains, and an inner passage leading to an inner chamber in which the thermostatic operating member is positioned. In this way steam or air will be directed to the thermostatic member so as to cause this member to either expand or contract, while the condensate will be shunted around the thermostatic member since a fluid at a temperature lower than that of the condensate has previously been required in order to cause the thermostat to contract or collapse. In the present improved construction, the outer condensate passage is eliminated and an adapter casting 30 is added to form an extension of the housing 18, the casting 30 having a hollow neck portion 31 threaded into the portion 32 of housing 18, and also having an intermediate collar portion 33 fitting into the recessed lower end of housing 18. All of the fluids returned to the vapor-regulator (steam, air and condensate) flow into and through neck portion 31 and thence downwardly into the chamber 35 of larger diameter formed in the lower portion of casting 30. The operating rod or link 17 (hereinabove described) extends through a guide passage 36 in a web 37 formed in casting 30, this web having cut-away portions 38 to permit the free vertical flow of the returned fluids into the lower chamber 35. A compression spring 39 is confined between the lower surface of web 37 and a cupped spring retainer 40 secured to the lower end of link 17. Spring 39 tends to pull the link downwardly and open valve 8.

A return housing 41 encloses a return chamber 42 in which the thermostatic assembly indicated generally at F is positioned. Housing 41 is open at its upper end and is secured by screw bolts 43 to the open lower end of adapter 30. The bolts 43 pass through lugs 44 extending outwardly from the adapter through an interposed gasket 45 into enlarged bosses 46 at the upper end of housing 41. Thus the return chamber 42 forms a downward extension of chamber 35 in the adapter 30. The bottom portion of housing 41 curves inwardly as indicated at 47 to a downwardly directed internally threaded neck portion 48 into which is connected the drain pipe 49.

An upwardly projecting supporting post 50 is secured at its lower end 51 in the central portion 52 of a spider 53 which bridges the drain outlet in the lower portion of casing 41. The improved thermostatic bellows indicated generally at F comprises an inverted cup-shaped member 54, the closed top 55 of which rests on the platform 56 formed at the upper end of supporting post 50. The thermostatic member F also comprises a circular top plate 57 which, when the thermostat is collapsed, rests on the upwardly projecting rib 58 formed in the top 55 of cup member 54. Plate 57 is formed with an upwardly projecting central threaded stud 59 which in some constructions is used to support the thermostatic member from some fixed member of an assembly, for example as shown in a vapor thermostat of somewhat different form disclosed and claimed in the copending application of the same inventors, Serial No. 288,104, filed of even date herewith. However, in the present construction, a cap or nut 60 is threaded onto the stud 59, this nut 60 being positioned to contact the rivet 61 at the lower end of link 17 and push this link upwardly against the resistance of spring 39 to close valve 8 when the thermostatic member F is expanded. A flexible metallic corrugated bellows structure 62 is secured at its upper end to the annular collar 63 formed on plate 57, and is similarly secured at its lower end to the flange 64 projecting outwardly at the lower end of cup 54. A suitable quantity of heat-sensitive fluid is confined within the thermostatic member F, that is between cup 54, bellows 62, and top plate 57. It will now be seen that the cup member 54 cannot move downwardly since it is suspended or mounted on the fixed post 50. When the thermostatic member is collapsed (as shown in the drawings) the upper plate 57 of the thermostatic member will rest on cup 54 and the bellows 62 will be contracted to its shortest length. However, when surrounded by steam or subjected to a steam temperature, the fluid within the thermostatic member will expand and force the top plate 57 upwardly thereby elongating bellows 62, and this will result in the link 17 being forced upwardly to close valve 8.

A preferably circular disk or plate 65 rests on the upper surface of plate 57, being centrally apertured to fit around the stud 59 and being held in place by nut 60. The disk or plate 65 is preferably circular, and a substantially cylindrical metallic shield member 66, open at its upper and lower ends, fits closely around disk 65 and is supported thereon by the inwardly extending annular collar 67 formed in shield 66 and resting on the peripheral portion of disk 65. Collar 67 is near the upper end of shield 66, and the shield is of sufficient length so that the upper open end portion thereof forms, with disk 65, a shallow receptacle 68, and the lower skirt portion of the shield extends downwardly far enough to rather closely enclose and protect the thermostatic bellows 62.

It will now be apparent that all of the condensate which drains down from return port 24 through chamber 35 will fall into the receptacle 68 at the upper end of the shield and thence will drain through a series of openings 69 formed in disk 65 directly onto the corrugations of the bellows 62, the water flowing over and around this bellows and eventually draining out through spider 53 into and through the drain pipe 49.

When the system is filled with steam and there is relatively little condensate flowing through the return chamber, this steam will substantially fill the chamber 42 and pass into and through shield 66 so as to cause the thermostat F to expand and close valve 8. However, when this steam condenses and the bellows 62 is exposed to a lower temperature, the thermostat will contract and let valve 8 be opened by spring 39 so as to admit additional steam to the radiating system. This will take place no matter whether valve C is in the open position to supply steam to radiator D, or if valve C is closed and the steam flow is shunted from supply pipe 21 directly back to the vapor regulator. If we assume that the desired temperature has been reached in the space being heated, and valve C has been closed, the steam remaining in the radiating system will condense and drain down either to the closed valve C, or into the drain pipe 27 above check valve 28, if such a drain pipe and valve is used. When valve C is again opened, and the vacuum has been broken so that this pocketed condensate can flow down, all of this condensate will quickly drain into the receptacle 68 at the top of shield 66 and will thence flow downwardly in direct contact with bellows 62. As already stated, this thermostat is so sensitive that the slightly lower temperature of this condensate will cause the bellows to collapse and permit valve 8 to be quickly and completely opened by the expansion of spring 39. At such times the cylindrical shield 66 will tend to protect the thermostatic bellows from any steam which may simultaneously enter the chamber 42 and insure the contraction of the thermostatic member F under the influence of the cooler condensate.

Since the present improved vapor-regulator is substantially shorter and more compact than those heretofore in use, it is desirable to extend the drain connection downwardly, particularly when mounted beneath a railway car, and this is one of the reasons that drain pipe 49 is used. Otherwise the fluids could be vented directly through the open neck portion 48. Since all of this vapor regulator assembly is exposed to the air when mounted beneath a railway car the problem of freezing in cold weather will arise. For this reason the drip opening is spaced downwardly from the regulator chamber 42, and the drain pipe 49 is enclosed by a jacket 70 of heat-insulating material. This insulating jacket is formed with an upper inwardly directed collar 71 fitting about the pipe 29, and with a similar inwardly directed collar 72 at its lower end held in place by the nut or gland 73 threaded on the lower end of drain pipe 49. An intermediate inwardly extending collar 74 engages about pipe 49 so as to space the central portion of the jacket from the pipe. As a consequence definite air spaces 75 are formed around the pipe 49 and between this pipe and the insulating jacket so as to minimize the heat loss from the drain pipe. Thus the temperature within this drain assembly will remain sufficiently high so that condensate will not freeze therein.

This improved vapor regulator makes possible the rapid feeding of steam coils or radiators, especially the steam coil in an air delivery duct where the flow of steam must be turned on and off at intervals in order to maintain the air flowing through the duct at the desired temperature. The success of this vapor-regulator depends on its ability to quickly and completely open and close the vapor-regulator valve at the limits of a relatively small temperature range, the high temperature condensate collected and discharged through the vapor regulator being sufficiently below steam temperature to cause the supply valve to open.

We claim:

1. In a vapor regulator, a valve to control the flow of steam from the source of supply to the radiating system, a return chamber into the upper portion of which the return pipe from the radiating system discharges gases and condensate, a sensitive thermostatic bellows positioned in the lower portion of the return chamber and designed and supported at its lower end so as to expand upwardly when subjected to steam temperature and to contract downwardly when subjected to the temperature of the condensate, connections between the upper end of the bellows and valve whereby the valve is closed and opened as the bellows expands and contracts respectively, a shield open at its upper and lower ends and enclosing the sides of the bellows, and means for directing the condensate downwardly through the shield and in intimate contact with the bellows.

2. In a vapor regulator, a valve to control the flow of steam from the source of supply to the radiating system, a return chamber into the upper portion of which the return pipe from the radiating system discharges gases and condensate, a sensitive thermostatic bellows positioned in the lower portion of the return chamber and designed and supported at its lower end so as to expand upwardly when subjected to steam temperature and to contract downwardly when subjected to the temperature of the condensate, connections between the upper end of the bellows and valve whereby the valve is closed and opened as the bellows expands and contracts respectively, a plate positioned above and supported by the movable upper portion of the bellows, and a shield open at its upper and lower ends and enclosing the sides of the bellows, the shield closely surrounding and being carried by the peripheral portion of the plate and projecting above the plate to form a cup which collects the condensate spilled downwardly from the return pipe, the plate being perforated so as to direct the collected condensate to flow downwardly over and in contact with the bellows.

3. In a vapor regulator, a valve to control the flow of steam from the source of supply to the radiating system, a return chamber into the upper portion of which the return pipe from the radiating system discharges gases and condensate, a sensitive thermostatic bellows positioned and supported at one end in the lower portion of the return chamber and designed to expand or contract respectively when subjected to steam temperature or the temperature of the condensate, connections between the movable end of the bellows and the valve whereby the valve is closed and opened as the bellows expands and contracts respectively, a shield open at its upper and lower ends and enclosing the sides of the bellows, and means for directing the condensate downwardly through the shield and in intimate contact with the bellows.

4. In a vapor regulator, a valve to control the flow of steam from the source of supply to the radiating system, a return chamber into the upper portion of which the return pipe from the radiating system discharges gases and condensate, a sensitive thermostatic bellows positioned and supported at one end in the lower portion of the return chamber and designed to expand or contract respectively when subjected to steam temperature or the temperature of the condensate, connections between the movable end of the bellows and the valve whereby the valve is closed and opened as the bellows expands and contracts respectively, a plate positioned closely above the bellows, and a shield open at its upper and lower ends and enclosing the sides of the bellows, the shield closely surrounding and being carried by the peripheral portion of the plate and projecting above the plate to form a cup which collects the condensate spilled downwardly from the return pipe, the plate being perforated so as to direct the collected condensate to flow downwardly over and in contact with the bellows.

5. In a vapor regulator, a valve to control the flow of steam from the source of supply to the radiating system, a return chamber that is closed except for an inlet port leading into the upper portion of the chamber and through which port the return pipe discharges gases and condensate into the chamber, and a drain outlet leading from the bottom of the chamber through which these fluids are discharged, a valve-operating stem projecting downwardly through the upper central portion of the chamber, a spring-retaining member carried at the lower end portion of the stem, a spring confined between the retaining member and an upper portion of the chamber and acting to move the stem downwardly to open the valve, a supporting post projecting upwardly in the lower central portion of the chamber, a sensitive thermostatic bellows supported by the post and having a movable upper portion adapted to engage and lift the stem, a plate of greater diameter than the spring-retainer and carried by the upper portion of the bellows, and a shield open at its upper and lower ends and enclosing the sides of the bellows, the shield closely surrounding and being carried by the peripheral portion of the plate and projecting above the plate to form a cup which collects the condensate spilled downwardly from the return pipe, the plate being perforated so as to direct the collected condensate over and in contact with the bellows.

6. In a vapor regulator, in combination with a valve, a thermostatically-operating valve actuating member comprising an end plate, a cup-shaped member having its closed end presented to the plate, a flexible corrugated metallic bellows surrounding the cup and having one end secured to the cup adjacent the open end thereof and having its other end attached to the peripheral portion of the plate, and a quantity of heat-responsive fluid in the space enclosed by the bellows, cup and end plate, means for directing condensate in contact with the exterior of the bellows, and members adapted to respectively engage the closed end of the cup within the cup and the outer surface of the plate and to be moved away from or toward one another as the fluid expands or contracts.

7. In a vapor regulator, in combination with a valve, a thermostatically-operating valve actuating member comprising an end plate, a cup-shaped member having its closed end presented to the plate, a flexible corrugated metallic bellows surrounding the cup and having one end secured to the cup adjacent the open end thereof and having its other end attached to the peripheral portion of the plate, and a quantity of heat-responsive fluid in the space enclosed by the bellows, cup and end plate, means for directing condensate in contact with the exterior of the bellows, a fixed supporting post projecting into the cup and engaging the closed end thereof, and connections between the movable end plate and the valve.

8. In combination with a radiating system, a valve for directing a flow of steam through the radiating system or shunting this flow of steam past the radiating system, a vapor-regulator comprising a valve for controlling this flow of steam from a source of supply, a return chamber into which this flow of steam and condensate formed therefrom are discharged, and a sensitive thermostatic bellows positioned in the return chamber and designed to expand when exposed to steam and to contract when contacted by the condensate, connections between the bellows and last mentioned valve whereby the valve is closed and opened as the bellows expands and contracts respectively, and means for collecting the condensate formed by the condensation of steam in the radiating system while the steam supply is cut off from this system by the first-mentioned valve and directing this collected condensate into contact with the bellows when steam is again admitted to the radiating system.

PAUL B. PARKS.
WILLIAM R. PETERSON.